(12) United States Patent
Chen et al.

(10) Patent No.: US 10,641,715 B2
(45) Date of Patent: May 5, 2020

(54) X-RAY IMAGING SYSTEM AND METHOD

(71) Applicants: Tsinghua University, Beijing (CN); Nuctech Company Limited, Beijing (CN)

(72) Inventors: Zhiqiang Chen, Beijing (CN); Li Zhang, Beijing (CN); Le Shen, Beijing (CN); Qingping Huang, Beijing (CN); Xin Jin, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 277 days.

(21) Appl. No.: 15/505,199

(22) PCT Filed: Dec. 23, 2015

(86) PCT No.: PCT/CN2015/098454
§ 371 (c)(1),
(2) Date: Feb. 20, 2017

(87) PCT Pub. No.: WO2016/161819
PCT Pub. Date: Oct. 13, 2016

(65) Prior Publication Data
US 2018/0217071 A1 Aug. 2, 2018

(30) Foreign Application Priority Data

Apr. 8, 2015 (CN) .......................... 2015 1 0162334

(51) Int. Cl.
*G01N 23/00* (2006.01)
*G01N 23/046* (2018.01)
*G01N 23/041* (2018.01)

(52) U.S. Cl.
CPC ......... *G01N 23/046* (2013.01); *G01N 23/041* (2018.02); *G01N 2223/1016* (2013.01); *G01N 2223/419* (2013.01)

(58) Field of Classification Search
CPC ................................ A61B 6/032; A61B 6/484
See application file for complete search history.

(56) References Cited

U.S. PATENT DOCUMENTS

2007/0183558 A1  8/2007 Hempel
2008/0242968 A1  10/2008 Claus et al.
(Continued)

FOREIGN PATENT DOCUMENTS

CN  101044987 A  10/2007
CN  101273919 A  10/2008
(Continued)

OTHER PUBLICATIONS

"International Application No. PCT/CN2015/098454, International Search Report dated Mar. 17, 2016", w/ English Translation, (Mar. 17, 2016), 8 pgs.
(Continued)

*Primary Examiner* — Dani Fox
(74) *Attorney, Agent, or Firm* — Schwegman Lundberg & Woessner, P.A.

(57) ABSTRACT

An X-ray imaging system and method are provided. The system may include: an X-ray source configured to irradiate X-ray beams; a first grating and a second grating arranged sequentially in an irradiation direction of the X-ray beams; a detector arranged at downstream of the second grating in the irradiation direction; and a controller and data processing device configured to control the X-ray source to irradiate the X-ray beams, to control the detector to receive X-ray beams passing through the first grating and the second grating to generate phase contrast information and/or dark field infor-
(Continued)

mation, and to perform CT check on an object under check based on the phase contrast information and/or the dark field information to obtain a CT image. In this way, it is possible to obtain more characteristic information about the object under check, so as to achieve more precise material recognition and security check.

17 Claims, 5 Drawing Sheets

(56) References Cited

U.S. PATENT DOCUMENTS

| | | | |
|---|---|---|---|
| 2011/0096970 A1 | 4/2011 | Vija | |
| 2014/0226783 A1* | 8/2014 | Ning | A61B 6/032 378/5 |

FOREIGN PATENT DOCUMENTS

| | | |
|---|---|---|
| CN | 101532969 A | 9/2009 |
| CN | 101943668 A | 1/2011 |
| CN | 102365052 A | 2/2012 |
| CN | 102781327 A | 11/2012 |
| CN | 103575750 A | 2/2014 |
| WO | WO-2009076700 A1 | 6/2009 |

OTHER PUBLICATIONS

"International Application No. PCT/CN2015/098454, Written Opinion dated Mar. 17, 2016", (dated Mar. 17, 2016), 5 pgs.
"Chinese Application Serial No. 201510162334.3, Office Action dated May 2, 2018", w/ English Translation, (May 2, 2018), 19 pgs.
Hao, J., et al., "Multi-energy X-ray imaging technique and its application in computed tomography", CT Theory and Applications 20.1, (2011), 141-150.
"Chinese Application Serial No. 201510162334.3, Office Action dated Dec. 2, 2019", (dated Dec. 2, 2019), 7 pgs.

* cited by examiner

X-RAY IMAGING SYSTEM AND METHOD

PRIORITY APPLICATIONS

This application is a U.S. National Stage Filing under 35 U.S.C. 371 from International Application No. PCT/CN2015/098454, filed on 23 Dec. 2015, and published as WO2016/161819 on 13 Oct. 2016, which claims the benefit of priority to Chinese Application No. 201510162334.3, filed on 8 Apr. 2015; which applications and publication are incorporated herein by reference in their entirety.

TECHNICAL FIELD

The present disclosure generally relates to radiation imaging, and more particularly, to a CT imaging system and method.

BACKGROUND

Existing X-ray imaging systems detect internal structures of an object in a non-destructive way based on attenuation properties of materials to X-rays, in order for material recognition or security check. For example, a transmission type luggage inspection apparatus that performs security check on luggage uses X-ray to perform transmission imaging of an object under check, to obtain an image which is attenuated in the transmission direction. Then, it is determined whether the object under check contains a dangerous article or not based on shapes or transmission values of articles included in the attenuation image which is represented in gray levels. Further, a CT-type luggage inspection apparatus performs CT scan on an object under check to obtain a section image of the object under check at a certain position, so as to determine internal structures of the object under check more precisely, for more precise material recognition and security check. However, those techniques have disadvantages such as false alarm or incorrect recognition. There is still a need for techniques for more precise and rapid check.

SUMMARY

In view of the disadvantages in the prior art, such as degraded ability of material recognition due to energy spectrum overlap, the present disclosure provides a CT imaging system and method.

According to an aspect of the present disclosure, there is provided an X-ray imaging system, comprising: an X-ray source configured to irradiate X-ray beams; a first grating and a second grating arranged sequentially in an irradiation direction of the X-ray beams; a detector arranged at downstream of the second grating in the irradiation direction of the X-ray beams; and a controller and data processing device configured to control the X-ray source to irradiate the X-ray beams, to control the detector to receive X-ray beams passing through the first grating and the second grating to generate phase contrast information and/or dark field information, and to perform CT check on an object under check based on the phase contrast information and/or the dark field information to obtain a CT image.

Preferably, the controller and data processing device may be further configured to control the X-ray source and the detector to perform Digital Radiography (DR) scan on the object under check to obtain the phase contrast information and/or the dark field information, to determine a position of interest in the object under check based on the phase contrast information and/or the dark field information, and to perform CT scan at the position of interest in the object under check to obtain the CT image.

Preferably, the CT image obtained by performing CT scan at the position of interest in the object under check may comprise at least one of a phase contrast image, a dark field image, an attenuation coefficient image, an atomic number image, or an electron density image.

Preferably, the CT scan may comprise one of circle-orbit CT scan, spiral-orbit CT scan, or grating-based CT phase contrast scan.

Preferably, the X-ray imaging system may further comprise a source grating arranged between the X-ray source and the first absorption grating. The object under check may undergo scanning between the source grating and the first absorption grating.

Preferably, the X-ray source and the detector are interchangeable in position to form a grating-based reverse-geometrical imaging system.

Preferably, the detector may comprise a linear array detector or a planar array detector.

Preferably, the first grating and the second grating each may be an absorption grating and/or a phase grating.

Preferably, the first grating and the second grating each may comprise a focusing grating, an arc-shaped grating or a polygonal-line shaped grating.

According to a further aspect of the present disclosure, there is provided an X-ray imaging method, comprising steps of: performing Digital Radiography (DR) scan on an object under check to obtain contrast information and/or dark field information; determining a position of interest in the object under check based on the contrast information and/or the dark field information; and performing CT scan at the position of interest in the object under check to obtain a CT image.

Preferably, the step of determining a position of interest in the object under check based on the contrast information and/or the dark field information may comprise: deriving internal features of the object under check from the contrast information and/or the dark field information for the object under check; and determining the position of interest based on the internal features if the internal features satisfy a predetermined condition.

Preferably, the CT image obtained by performing CT scan at the position of interest in the object under check may comprise at least one of a phase contrast image, a dark field image, an attenuation coefficient image, an atomic number image, or an electron density image.

Preferably, the CT scan may comprise one of circle-orbit CT scan, spiral-orbit CT scan, or grating-based CT phase contrast scan.

According to a still further aspect of the present disclosure, there is provided an X-ray imaging system, comprising: an X-ray source configured to irradiate X-ray beams; a first grating and a second grating arranged sequentially in an irradiation direction of the X-ray beams; a detector arranged at downstream of the second grating in the irradiation direction of the X-ray beams; and a controller and data processing device configured to control the X-ray source to irradiate the X-ray beams, to control the detector to receive X-ray beams passing through the first grating and the second grating to generate phase contrast information and/or dark field information, to generate a Digital Radiography (DR) image by scan without using the first and second gratings, and to determine whether the object under check contains a suspected article based on the DR image and also the phase contrast information and/or the dark field information.

According to a still further aspect of the present disclosure, there is provided an X-ray imaging system, comprising: a first X-ray check device configured to obtain a Digital Radiography (DR) image of an object under check; a second X-ray check device configured to obtain phase contrast information and/or dark field information of the object under check; and a controller and data processing device configured to determine whether the object under check contains a suspected article based on the DR image and also the phase contrast information and/or the dark field information.

According to a still further aspect of the present disclosure, there is provided an X-ray imaging system, comprising: a first X-ray CT device configured to obtain an X-ray CT image of an object under check; a second X-ray CT device configured to obtain a phase contrast CT image and/or a dark field CT image of the object under check; and a controller and data processing device configured to determine whether the object under check contains a suspected article based on the X-ray CT image and also the phase contrast CT image and/or the dark field CT image.

According to a still further aspect of the present disclosure, there is provided an X-ray imaging system, comprising: an X-ray check device configured to obtain a Digital Radiography (DR) image of an object under check; an X-ray CT device configured to obtain a phase contrast CT image and/or a dark field CT image of the object under check; and a controller and data processing device configured to determine whether the object under check contains a suspected article based on the DR image and also the phase contrast CT image and/or the dark field CT image.

According to a still further aspect of the present disclosure, there is provided an X-ray imaging system, comprising: an X-ray source configured to irradiate X-ray beams; a first grating and a second grating arranged sequentially in an irradiation direction of the X-ray beams; a detector arranged at downstream of the second grating in the irradiation direction of the X-ray beams; and a controller and data processing device configured to control the X-ray source and the detector to perform CT scan on an object under check to obtain a CT image, and to control to use the first and second gratings based on information from the CT image to generate phase contrast information and/or dark field information of the object under check.

In this way, it is possible to obtain more characteristic information about the object under check, so as to achieve more precise material recognition and security check.

BRIEF DESCRIPTION OF THE DRAWINGS

The attached drawings illustrate embodiments of the present disclosure. The drawings together with the following detailed descriptions exemplify some embodiments of the present disclosure in a non-limiting and non-exclusive way, in which.

DETAILED DESCRIPTION

Hereinafter, specific embodiments of the present disclosure will be described in detail. It is to be noted that the embodiments are provided for illustration purpose only, but not intended to limit the present disclosure. In the following descriptions, some specific details are set forth to provide thorough and complete understanding of the present disclosure. However, it is apparent for those skilled in the art that the present disclosure can be implemented without those specific details. In other embodiments, well-known circuitries, materials or methods are not described in detail so as not to obscure the present disclosure.

Figure 1:
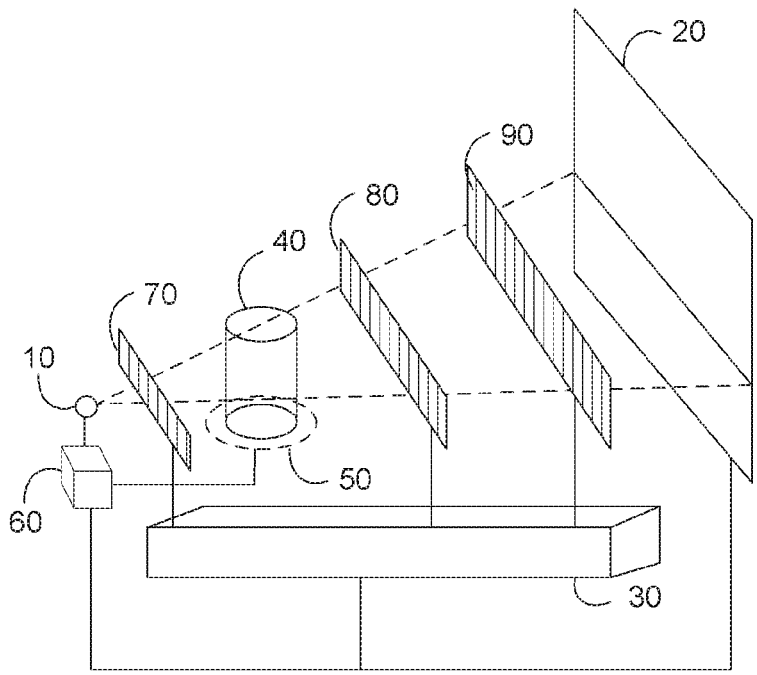
FIG. 1 is a structural diagram schematically showing an X-ray imaging system according to an embodiment of the present disclosure.

FIG. 1 is a structural diagram schematically showing an X-ray imaging system according to an embodiment of the present disclosure. As shown in FIG. 1, the X-ray imaging system according to this embodiment may include an X-ray source 10, a detector 20, a driving mechanism 30, an elevating and rotating mechanism 50, a controller and imaging computer 60, a source grating 70, a first absorption grating 80 and a second absorption grating 90. For example, the X-ray source 10 may include an X-ray machine or the like, and the detector 20 may include a linear array detector, a planar array detector or the like. Though the source grating 70 is included in the example as shown, it is to be understood by those skilled in the art that there can be no such a source grating provided that light spot from the X-ray source 10 is small enough. In the case where the source grating 70 is included, the source grating 70 may be arranged between the X-ray source 10 and the first absorption grating 80, so that an object 40 to be scanned can undergo scanning between the source grating 70 and the first absorption grating 80. Though there are the absorption gratings 80 and 90 in the illustrated embodiment, phase gratings can be used instead.

For example, in the case where the linear array detector is used together with the source grating 70, the first absorption grating 80 and the second absorption grating 90, digital radiography (DR) scan and two-dimensional (2D) circle-orbit fan-beam CT scan can be implemented. In the DR scan mode, a preliminary determination can be made by obtaining DR images of first-order phase information and dark field information, to recognize whether there is non-uniformity in the object such as liquid. Then, a final determination can be made based on CT images of phase information, dark field information and attenuation coefficients to recognize components of the liquid.

Figure 2:
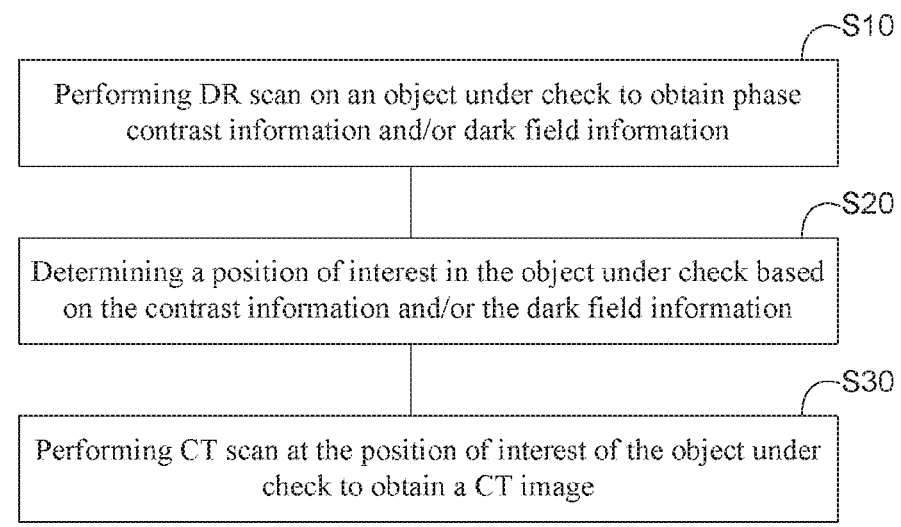
FIG. 2 is a flowchart schematically showing an operation process of an X-ray imaging system according to an embodiment of the present disclosure.

In an example operation process, as shown in FIG. 2, at step S10, the controller and imaging computer 60 may control the X-ray source 10, the detector 20 and the elevating and rotating mechanism 50 to perform DR scan on the object 40 under check, to obtain phase contrast information and/or dark field information or the like of the object under check by the detector 20. Then, at step S20, the controller and imaging computer 60 may determine a position of interest in the object under check based on the phase contrast information and/or the dark field information. Then, at step S30, the controller and imaging computer 60 may control the driving mechanism 30 to move the source grating 70, the first absorption grating 80 and the second absorption grating 90 from the field of view, and perform CT scan, such as circle-orbit CT scan, spiral-orbit CT scan or the like, on the object under check at the position of interest, to obtain a CT image of the object under check, in order for material recognition or to determine whether there is a dangerous article or a contraband article or not.

In a preferred embodiment, the CT image obtained by the CT scan at the position of interest in the object under check may include at least one of a phase contrast image, a dark field image, an attenuation coefficient image, an atomic number image, or an electron density image. Specifically, internal features of the object under check can be derived from the phase contrast information and/or the dark field information of the object under check. If the internal features satisfy a predetermined condition, the position of interest can be determined based on the internal features, so that the CT scan can be performed at this position. In this way, it is possible to improve not only accuracy but also speed of the check.

In another example operation process, after obtaining the position of interest, it is also possible that the controller and imaging computer 60 does not move the driving mechanism 30 from the field of view, but performs grating-based CT imaging process on the object under check at the position of interest to obtain a CT image, in order for material recognition or to determine whether there is a dangerous article or a contraband article or not.

In the above operation processes, the object under check undergoes DR imaging (for example, grating-based DR imaging) to determine the position of interest, and then undergoes CT scan such as circle-orbit CT scan or other grating-based CT phase contrast scan. However, those skilled in the art will appreciate that the above X-ray imaging system can perform CT scan without using gratings and also grating-based CT scan on the object under check, and then incorporate information from those two times of scan for security check. In other embodiments, it is also possible to perform DR scan without using gratings and also grating-based DR scan on the object under check, and then incorporate information from those two times of scan for security check.

In addition, it is described that the CT check is carried out based on the phase contrast information and/or the dark field information in the illustrated embodiments. In other embodiments, it is also possible to perform CT check on the object under check, and then perform grating-based phase contrast imaging and/or dark field imaging on the object under check or liquid based on actual situations reflected by information obtained in the CT check, such as internal structures of the object or information about that liquid contains internal structures, to obtain the phase contrast information and/or the dark field information.

Figure 3:
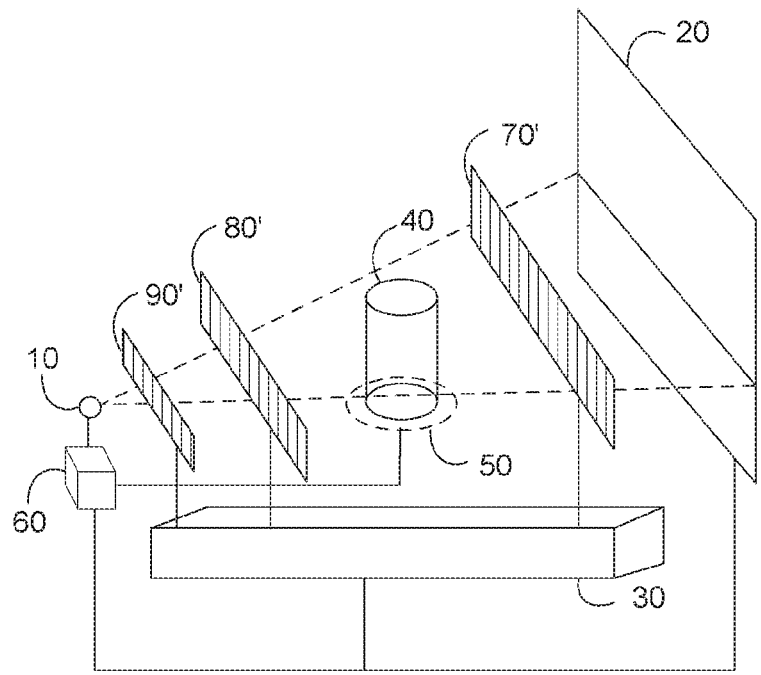
FIG. 3 is a structural diagram schematically showing an X-ray imaging system according to a further embodiment of the present disclosure.

FIG. 3 is a structural diagram schematically showing an X-ray imaging system according to a further embodiment of the present disclosure. The embodiment shown in FIG. 3 relates to a grating-based reverse-geometrical imaging system. In the system of FIG. 3, the X-ray source 10 and the detector 20 are interchanged in position, as compared to the system of FIG. 1, to implement grating-based reverse-geometrical light path.

In the example of grating-based reverse-geometrical imaging as shown in FIG. 3, the light path is not changed while the X-ray source 10 and the detector 20 are interchanged in position as compared to the system of FIG. 1. For normal geometric imaging, areas of the gratings have following relationship: an area of the source grating <an area of the first grating <an area of the second grating, and periods of the gratings have following relationship: a period of the first grating <a period of the second grating <a period of the source grating; while for reverse-geometric imaging, the following relationship holds: the area of the source grating>the area of the first grating>the area of the second grating, and the periods keep unchanged, which facilitates fabrication.

Figure 4:
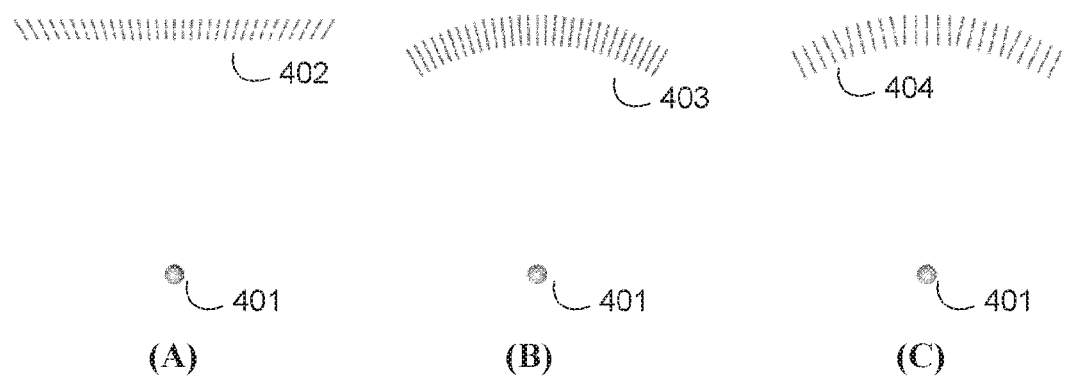
FIG. 4 is a schematic view showing structures of gratings adopted in an X-ray imaging system according to embodiments of the present disclosure.

FIG. 4 is a schematic view showing structures of gratings adopted in the X-ray imaging system according to embodiments of the present disclosure. In embodiments of the present disclosure, for divergent beams, the grating can be designed to be focusing or almost focusing. Reference may be made to implementations shown in (A), (B) and (C) of FIG. 4. Specifically, (A) shows a light source 401 and a focusing grating 402, (B) shows a light source 401 and an arc-shaped grating 403, and (C) shows a light source 401 and a polygonal-line shaped grating 404.

In addition, the second absorption grating 90 functions to shield half an area of cells of the detector (for example, a linear array detector includes a plurality of detector cells). Therefore, if pixels of the detector approximate the period of the grating, the shielding of the second absorption grating can be implemented by shielding a half of the detector.

Figure 5:
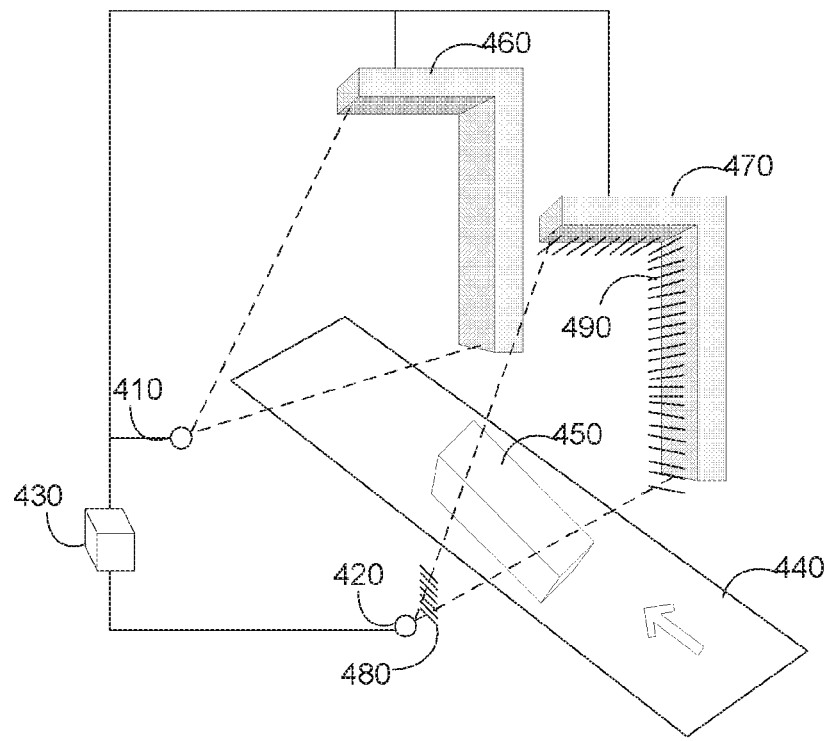
FIG. 5 is a structural diagram schematically showing an X-ray imaging system according to a still further embodiment of the present disclosure.

FIG. 5 is a structural diagram schematically showing an X-ray imaging system according to a still further embodiment of the present disclosure. As shown in FIG. 5, the X-ray imaging system may include at least one grating-based DR imaging sub-system, including an X-ray source 420, a first absorption grating 480 and a second absorption grating 490, and a detector 470. In addition, a second DR imaging sub-system can be added, which can be either dual-energy X-ray DR or grating-based DR. For example, the second system may include an X-ray source 410 and a detector 460.

An object under check 450 may be moved on a carrier mechanism 440 to pass through the two systems. A controller and imaging computer 430 may control the first system and the second system to carry out check, respectively, to obtain phase contrast information, dark field information, transmission information, electron density information, atomic number information, or the like, and then incorporate the above pieces of information for security check and material recognition. For example, the controller and imaging computer may select at least two or three pieces from the above information for security check or material recognition.

Figure 6:
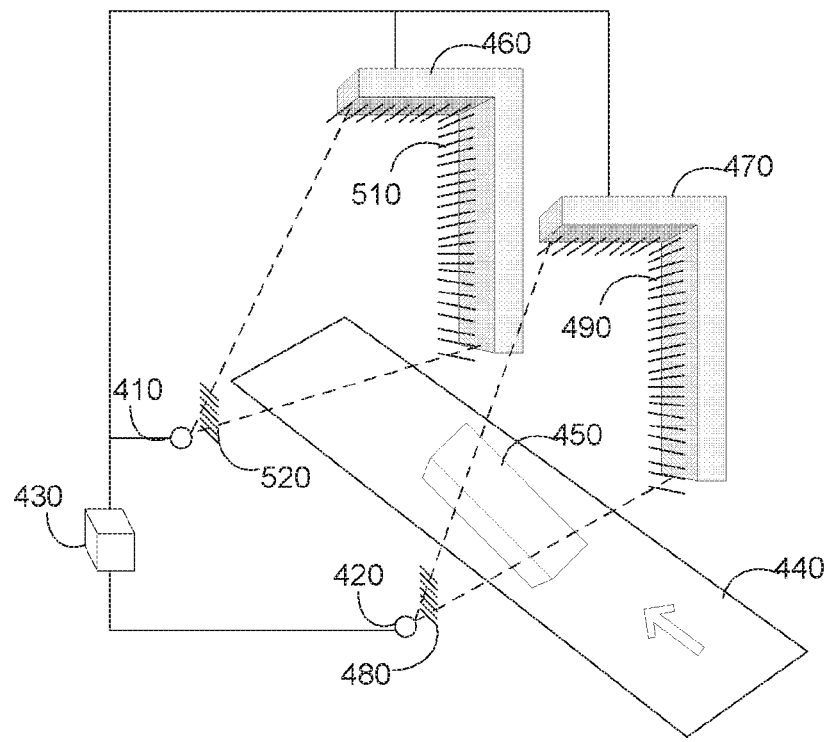
FIG. 6 is a structural diagram schematically showing an X-ray imaging system according to a still further embodiment of the present disclosure.

FIG. 6 is a structural diagram schematically showing an X-ray imaging system according to a still further embodiment of the present disclosure. In the example shown in FIG. 6, the X-ray imaging system may include two grating-based DR systems. Among them, the first system may include a source grating 480 and an absorption grating 490, and the second system may include a source grating 520 and an absorption grating 510.

In other embodiments, an X-ray imaging system may include a grating-based CT imaging sub-system and a normal dual-energy X-ray CT imaging sub-system. An object under check may be moved by a carrier mechanism into those two CT systems for CT scan and reconstruction. For the dual-energy X-ray CT imaging sub-system, characteristic quantities such as electron density, atomic number, attenuation coefficients at high energy, attenuation coefficients at low energy, or the like at a scanned section can be obtained. For the grating-based CT imaging sub-system, characteristic quantities such as refractive index, dark field information, information on attenuation coefficients, or the like at a scanned section can be obtained. At least two characteristic quantities can be selected from the above mentioned ones for recognition of dangerous articles.

Figure 7:
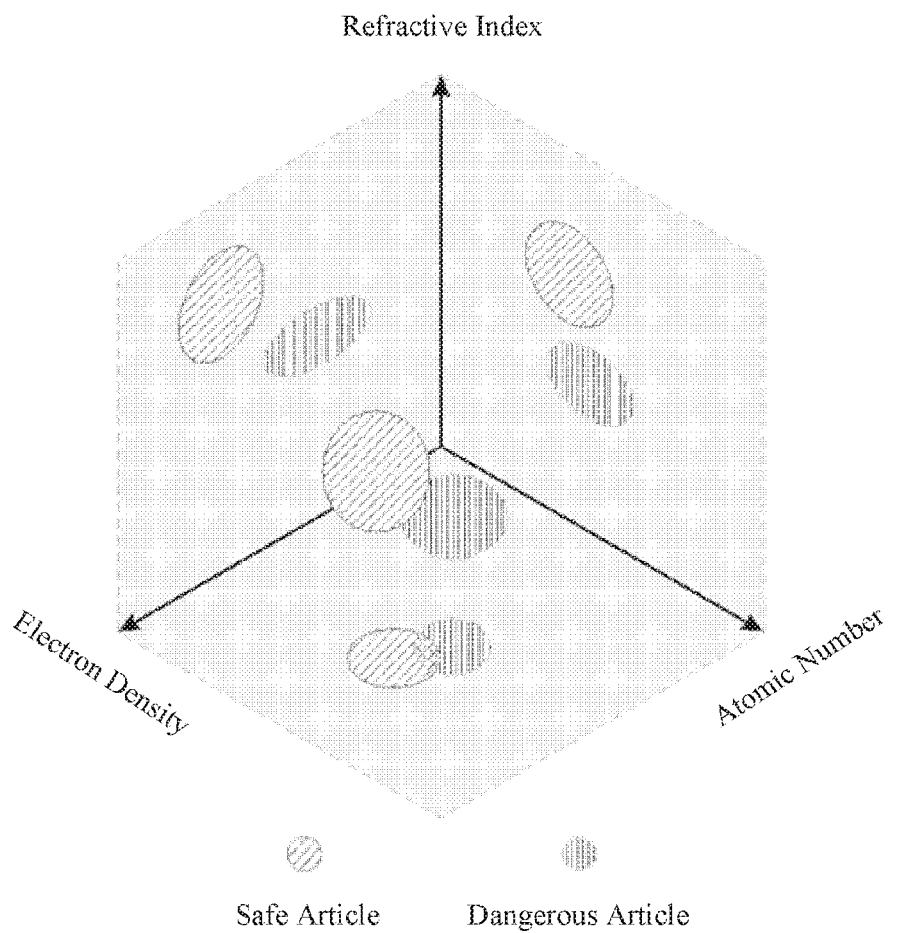
FIG. 7 shows an example of material recognition or dangerous article recognition according to an embodiment of the present disclosure.
Figure 8:
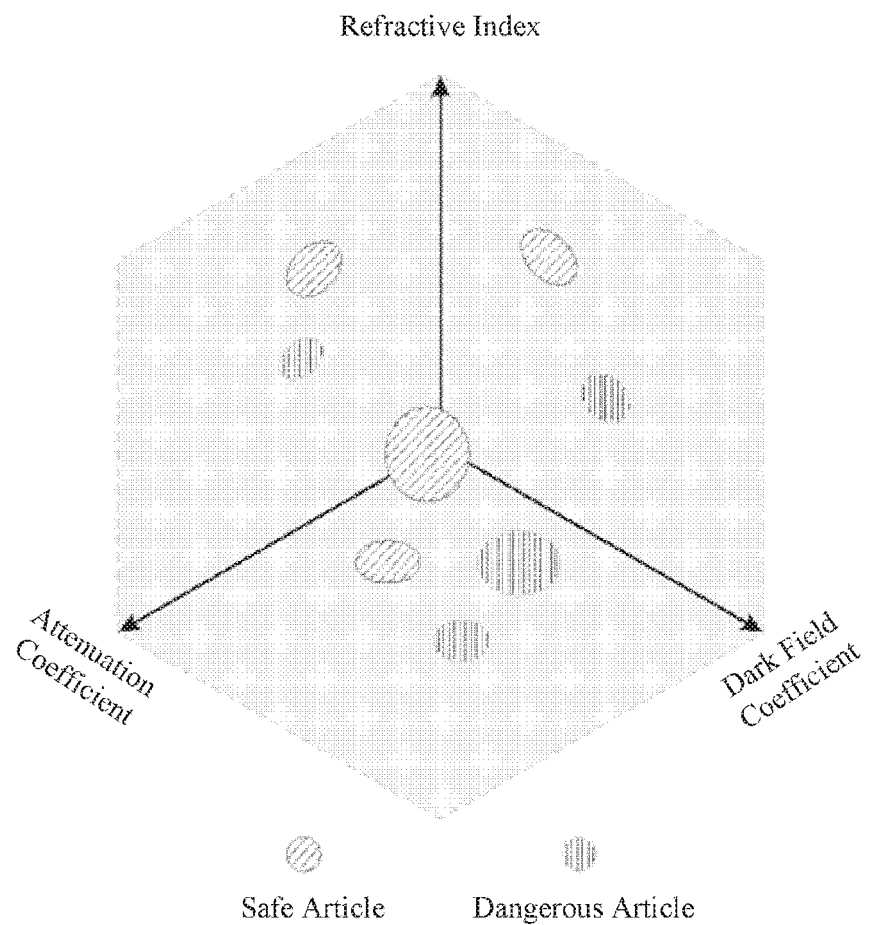
FIG. 8 shows another example of material recognition or dangerous article recognition according to a further embodiment of the present disclosure.

FIG. 7 shows an example of material recognition or dangerous article recognition according to an embodiment of the present disclosure. As shown in FIG. 7, the dangerous article recognition is carried out based on electron density, atomic number, and refractive index. FIG. 8 shows another example of material recognition or dangerous article recognition according to a further embodiment of the present disclosure. As shown in FIG. 8, the dangerous article recognition is carried out based on attenuation coefficient, dark field information, and refractive index. As described above, due to the usage of both the grating-based imaging and the imaging without grating, more pieces of characteristic information can be incorporated to achieve more precise check results.

The above detailed descriptions have illustrated various embodiments of the X-ray imaging system and method by block diagrams, flowcharts and/or examples. In a case where such a block diagram, flowchart and/or example includes one or more functions and/or operations, it is to be understood by those skilled in the art that each of the functions and/or operations in the block diagram, flowchart and/or example can be implemented by various hardware, software, or firmware alone and/or any combination thereof. In an embodiment, some parts of the subject matter described in embodiments of the present disclosure can be implemented by Application Specific Integrated Circuits (ASICs), Field Programmable Gate Arrays (FPGAs), Digital Signal Processors (DSPs) or other integrated formats. However, those skilled in the art will appreciate that some aspects of the embodiments disclosed herein, partially or as a whole, can be equally implemented by an Integrated Circuit, one or more computer programs running on one or more computers (for example, one or more programs running on one or more computer systems), one or more programs running on one or more processors (for example, one or more programs running on one or more microprocessors), firmware, or any combination thereof. One skilled person in the art has the ability of designing a circuitry and/or writing software and/or firmware codes according to the present disclosure. Further, it is to be understood by those skilled in the art that the mechanism of the subject matter of the present disclosure can be distributed in various forms of program products, and that all embodiments are applicable regardless of specific types of signal carrying media which are used to carry out the distribution. Examples of the signal carrying media include, but not limited to, recordable media such as floppy disk, hard disk driver, compact disk (CD), digital versatile disk (DVD), digital tape, or computer memory, or transmission type media such as digital and/or analog communication media (for example, fiber cable, waveguide, wired communication link, wireless communication like, or the like).

Though the present disclosure is described by referring to some embodiments thereof, it is to be understood that terminologies used herein are illustrative, not in a limiting sense. The present disclosure can be implemented in various forms without departing from the spirit or substance of the present disclosure. Therefore, it is to be understood that the above embodiments are not intended to be limited by the foregoing details, and should be interpreted broadly in the spirit and scope as defined in the following claims. All changes and modifications falling in the scope of the claims and equivalents thereof are to be covered by the following claims.

We claim:

1. An X-ray imaging system, comprising:
   an X-ray source configured to irradiate X-ray beams;
   a first grating and a second grating arranged sequentially in an irradiation direction of the X-ray beams;
   a detector arranged at downstream of the second grating in the irradiation direction of the X-ray beams; and
   a controller and data processing device configured to control the X-ray source to irradiate the X-ray beams, to control the detector to receive X-ray beams passing through the first grating and the second grating to generate phase contrast information and/or dark field information, and to perform CT check on an object under check based on the phase contrast information and/or the dark field information to obtain a CT image, wherein the controller and data processing device is further configured to control the X-ray source and the detector to perform Digital Radiography (DR) scan on the object under check to obtain the phase contrast information and/or the dark field information, to determine a position of interest in the object under check based on the phase contrast information and/or the dark field information, and to perform CT scan at the position of interest in the object under check to obtain the CT image.

2. The X-ray imaging system of claim 1, wherein the CT image obtained by performing CT scan at the position of interest in the object under check comprises at least one of a phase contrast image, a dark field image, an attenuation coefficient image, an atomic number image, or an electron density image.

3. The X-ray imaging system of claim 1, wherein the CT scan comprises one of circle-orbit CT scan, spiral-orbit CT scan, or grating-based CT phase contrast scan.

4. The X-ray imaging system of claim 1, further comprising a source grating arranged between the X-ray source and the first absorption grating, wherein the object under check undergoes scanning between the source grating and the first absorption grating.

5. The X-ray imaging system of claim 1, wherein the X-ray source and the detector are interchangeable in position to form a reverse-geometrical grating-based imaging system.

6. The X-ray imaging system of claim 1, wherein the detector comprises a linear array detector or a planar array detector.

7. The X-ray imaging system of claim 1, wherein the first grating and the second grating each are an absorption grating and/or a phase grating.

8. The X-ray imaging system of claim 1, wherein the first grating and the second grating each comprise a focusing grating, an arc-shaped grating or a polygonal-line shaped grating.

9. An X-ray imaging method, comprising steps of:
   performing Digital Radiography (DR) scan on an object under check to obtain contrast information and/or dark field information;
   determining a position of interest in the object under check based on the contrast information and/or the dark field information; and
   performing CT scan at the position of interest in the object under check to obtain a CT image.

10. The method of claim 9, wherein the step of determining a position of interest in the object under check based on the contrast information and/or the dark field information comprises:
deriving internal features of the object under check from the contrast information and/or the dark field information for the object under check; and
determining the position of interest based on the internal features if the internal features satisfy a predetermined condition.

11. The method of claim 9, wherein the CT image obtained by performing CT scan at the position of interest in the object under check comprises at least one of a phase contrast image, a dark field image, an attenuation coefficient image, an atomic number image, or an electron density image.

12. The method of claim 9, wherein the CT scan comprises one of circle-orbit CT scan, spiral-orbit CT scan, or grating-based CT phase contrast scan.

13. An X-ray imaging system, comprising:
an X-ray source configured to irradiate X-ray beams;
a first grating and a second grating arranged sequentially in an irradiation direction of the X-ray beams;
a detector arranged at downstream of the second grating in the irradiation direction of the X-ray beams; and
a controller and data processing device configured to control the X-ray source to irradiate the X-ray beams, to control the detector to receive X-ray beams passing through the first grating and the second grating to generate phase contrast information and/or dark field information, to generate a Digital Radiography (DR) image by scan without using the first and second gratings, and to determine whether the object under check contains a suspected article based on the DR image and also the phase contrast information and/or the dark field information,
wherein the controller and data processing device is further configured to:
determine a position of interest in the object under check based on the phase contrast information and/or the dark field information,
generate the DR image by scanning the position of interest in the object under check without using the first and second gratings, and
determine whether the object under check contains a suspected article based on the DR image obtained by scanning the position of interest.

14. An X-ray imaging system, comprising:
a first X-ray check device configured to obtain a Digital Radiography (DR) image of an object under check;
a second X-ray check device configured to obtain phase contrast information and/or dark field information of the object under check; and
a controller and data processing device configured to determine whether the object under check contains a suspected article based on the DR image and also the phase contrast information and/or the dark field information,
wherein the first X-ray check device configured to is further configured to:
determine a position of interest in the object under check based on the phase contrast information and/or the dark field information,
obtain the DR image of the object under check by scanning the position of interest in the object under check, and
determine whether the object under check contains a suspected article based on the DR image obtained by scanning the position of interest.

15. An X-ray imaging system, comprising:
a first X-ray CT device configured to obtain an X-ray CT image of an object under check;
a second X-ray CT device configured to obtain a phase contrast CT image and/or a dark field CT image of the object under check; and
a controller and data processing device configured to determine whether the object under check contains a suspected article based on the X-ray CT image and also the phase contrast CT image and/or the dark field CT image,
wherein the controller and data processing device is further configured to:
determine a position of interest in the object under check based on the phase contrast CT image and/or the dark field CT image,
obtain the X-ray CT image of the object under check by scanning the position of interest in the object under check, and
determine whether the object under check contains a suspected article based on the X-ray CT image obtained by scanning the position of interest.

16. An X-ray imaging system, comprising:
an X-ray check device configured to obtain a Digital Radiography (DR) image of an object under check;
an X-ray CT device configured to obtain a phase contrast CT image and/or a dark field CT image of the object under check; and
a controller and data processing device configured to determine whether the object under check contains a suspected article based on the DR image and also the phase contrast CT image and/or the dark field CT image,
wherein the controller and data processing device is further configured to:
determine a position of interest in the object under check based on the phase contrast CT image and/or the dark field CT image,
obtain the DR image of the object under check by scanning the position of interest in the object under check, and
determine whether the object under check contains a suspected article based on the DR image obtained by scanning the position of interest.

17. An X-ray imaging system, comprising:
an X-ray source configured to irradiate X-ray beams;
a first grating and a second grating arranged sequentially in an irradiation direction of the X-ray beams;
a detector arranged at downstream of the second grating in the irradiation direction of the X-ray beams; and
a controller and data processing device configured to control the X-ray source and the detector to perform CT scan on an object under check to obtain a CT image, and to control to use the first and second gratings based on information from the CT image to generate phase contrast information and/or dark field information of the object under check,
wherein the controller and data processing device is further configured to:
determine a position of interest in the object under check based on the phase contrast information and/or dark field information, and perform CT scan at the position of interest in the object under check to obtain the CT image.

\* \* \* \* \*